Dec. 12, 1967 E. M. STOLZ 3,357,279
METHOD OF MANUFACTURING A CUTTER OR DRILL
BIT WITH REPLACEABLE CUTTING EDGE
Filed April 20, 1965 2 Sheets-Sheet 1

Elmer M. Stolz
INVENTOR.

BY Clarence A. O'Brien
and Harvey B. Jacobson
Attorneys

Dec. 12, 1967  E. M. STOLZ  3,357,279
METHOD OF MANUFACTURING A CUTTER OR DRILL
BIT WITH REPLACEABLE CUTTING EDGE
Filed April 20, 1965  2 Sheets-Sheet 2

Elmer M. Stolz
INVENTOR.

BY *Clarence A. O'Brien*
and *Harvey B. Jackson*
Attorneys 3,357,279
METHOD OF MANUFACTURING A CUTTER OR DRILL BIT WITH REPLACEABLE CUTTING EDGE
Elmer M. Stolz, Sanford Ave., Nokomis, Ill. 62075
Filed Apr. 20, 1965, Ser. No. 449,602
6 Claims. (Cl. 76—101)

ABSTRACT OF THE DISCLOSURE

A drill bit having a cutting edge or blade replaceably bonded thereto and the method of effecting the bonding of the blade and the contouring of the blade so as to define a hollow ground edge. The material of the replaceable blade is built up on the body of the bit and simultaneously formed with a planar cutting edge with this cutting edge being laterally offset from the adjoining portion of the body. After the cutting edge has been so defined this edge, immediately adjacent the body, is fused so as to smoothly slope into the adjoining edge of the body, thereby providing a slightly concave contour.

---

This invention comprises a novel and useful method of manufacturing a cutter or drill bit with a replaceable cutting edge and more particularly pertains to an improved metal bit especially adapted for use in mining machine cutting chains and the like together with a method of manufacturing the improved bit.

This invention relates to an improved replaceable tool bit of a type especially adapted for use in the cutting chains of mining machinery or with tool bit holders of drilling apparatus. An essential feature of the bit of this invention is that it is similar to a hollow ground bit with its improved operating characteristics and that the worn cutting surfaces of the bit may be readily restored and renewed in order to prolong the life of the bit.

The primary object of the invention is to provide a method for forming or for reconditioning replaceable tool bits having cutting edges of the hollow ground type.

Another object of the invention is to provide a method and a drill bit of the type above set forth which will enable the cutting edges of the bits to be of various standard types as for example of the chisel type or other type.

A further and more specific object of the invention is to provide a cutter or drill bit and a method of making of the same wherein the bit is particularly adapted for mounting in a holder such as the type disclosed in the mining chain construction of the prior patent to Fulke, No. 2,322,929 of June 29, 1943.

A still further specific object of the invention is to provide a method of forming or reconditioning tool bits in accordance with the principles of but shall constitute an improvement over the method disclosed in my prior Patent No. 2,682,180 of June 29, 1954.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURES 4–7 are diagrammatic views showing successive steps in the formation of or in the re-conditioning of a tool bit in accordance with this invention and in which;

FIGURE 4 is a diagrammatic view in vertical section of a jig and of a drill bit body cooperatively positioned for the first step of forming a cutting tip upon the bit;

FIGURE 5 is a view sequential to FIGURE 4 and showing the second step in the form of the replaceable cutting portion on the bit and showing the manner of applying material to the cutting tip of the bit body;

Figure 6:
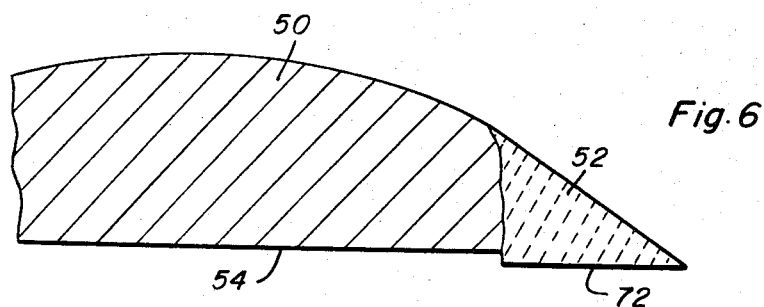
Figure 7:
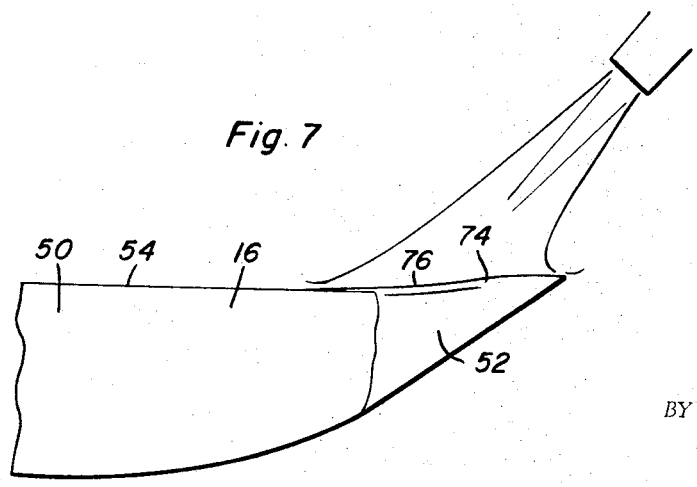

FIGURE 6 is a sequential third step in the method of forming the drill bit and showing the bit body with the applied or restored tip being removed from the jig; and FIGURE 7 is a view showing the fourth step and the method of forming the bit in which the applied material of the cutting tip is being fused, molded and contoured into a smooth junction with the bit body to provide a concave or hollow ground cutting edge.

Figure 1:
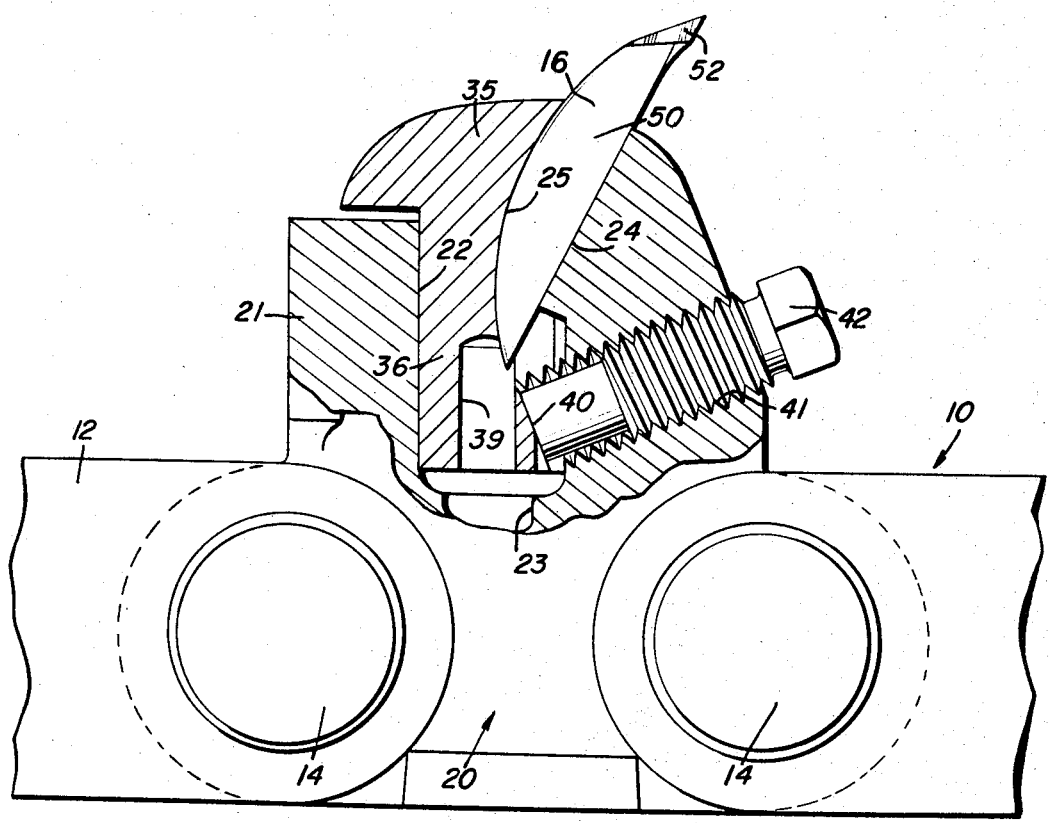
FIGURE 1 is a view partly in side elevation and partly in vertical longitudinal section of a suitable embodiment of the replaceable tool bit in accordance with this invention and detachably mounted in a holder such as that of a mining machine cutter chain.

Many apparatuses and machines employ a quantity of replaceable cutter bits in order to perform their mining drilling or cutting operations. As these bits wear, their replacement from time to time is necessary in order that the apparatus or machine may continue with its desired operation. Although not limited thereto, the cutter bit whose construction and method of manufacture and reconditioning forms the subject matter of this invention is particularly adapted for use with the cutting chain of mining machines such as that disclosed in the patent to Fulke, No. 2,322,929 above-mentioned and for purposes of illustration FIGURE 1 shows the replaceable cutter bit installed in the holder of such a mining chain. For convenience of understanding this particular application of the principles of the invention, the same reference numerals are applied in FIGURE 1 of the drawings as are used for corresponding parts in the structure shown in the patent to Fulke.

Figure 2:
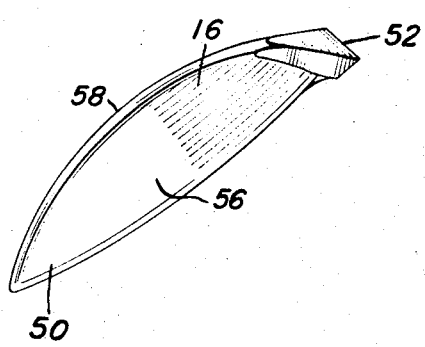
FIGURE 2 is a perspective view from the side of the replaceable tool bit according to the invention.
Figure 3:
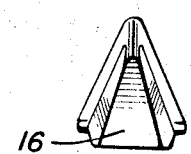
FIGURE 3 is a front elevational view of the cutting edge of the tool bit of FIGURE 2.
Figure 4:
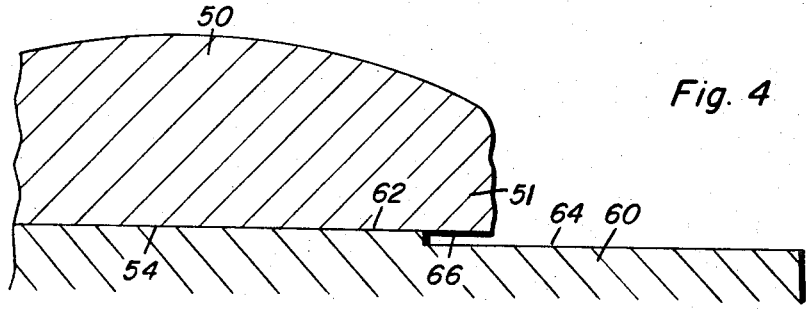

As in the Fulke patent, the numeral 10 designates generally a portion of a mining chain of an apparatus of any suitable character, which has links 12 joined by pivot pins 14. Tool holders 20 are interconnected between the links and serve to detachably support two elements or cutting bits in accordance with this invention and which are indicated by the numeral 16. The configuration of the replaceable tool bit will be more apparent from a consideration of FIGURES 1, 2 and 3.

The tool bit carrying member 20 comprises a holder or head 21 having a bore 22 therethrough with the diametrically reduced portion 23. The open upper end of this bore is provided with an inclined flat shoulder or surface 24. Cooperating with the surface 24 and opposing the same is a concave surface 25 formed upon a clamping element 35 which has a shank 36 snugly and slidably receivable in the bore 22. It will be observed that that lower end of the shank is provided with a bore 39 into which the lower end of the bit 16 extends and where the lower end of the seat 25 terminates. The side of the shank 36 is provided with an inclined seat or shoulder 40 adapted to be engaged by the lower end of a fastening means in the form of a bolt 42 engaged in the internally threaded bore 41. The arrangement is such that as the bolt is threaded into the bore 41, it will engage the shoulder 40 and thus move the shank 36 and the holder 35 downwardly and due to the configuration of the concave seat 25 and the flat shoulder 24 and the shape of the tool bit 16 will tightly clamp and seat the latter in place in the holder.

As above-mentioned, this fastening arrangement for releasably holding a cutter bit in the holder element of a machine such a mining chain is conventional as shown in the Fulke patent.

It is the bit itself and the method of forming and reconditioning the latter which forms the subject matter of the invention set forth and claimed herein. The bit 16 is an elongated body having a main body portion 50 together with a blade portion 51. Preferably in accordance with conventional practice the blade portion is of a much harder material than the metal of the body portion and is homogeneously united therewith as by welding or the like in order to provide a long wearing hard and durable cutting edge for the bit. The body 50 of the bit is generally triangular in cross-section having a relatively flat or planar cutting face or surface 54 from the opposite edges of which extend upwardly curving and converging sides 56. From end to end the bit has a concave edge or surface 58.

It has been found that when the cutting edge of the bit is of a hollow ground or undercut character, the efficiency of the bit and its life is greatly prolonged. Accordingly, it is an important purpose of this invention to provide a method whereby when the worn cutting blade portion of the bit is restored the desired hollow ground effect may be provided. The method of forming a new bit or reconditioning the worn bit in accordance with this invention is illustrated in FIGURES 4-7 and corresponds generally to the method set forth in my prior Patent No. 2,682,180. For this purpose, there is provided a metallic jig or plate 60 having a flat planar bit receiving surface 62 with a recessed or cut-away portion 64. The surface 62 is adapted to receive flush thereon the flat planar surface 54 of the bit body 50 with the end portion of the bit body containing a cutting blade portion 51 or the remnant thereof being positioned to overhang the recess 64 and thus provide a slight clearance 66 therebetween. In the position shown in FIGURE 4, the bit forming or the bit restoring operation is ready to begin.

Figure 5:
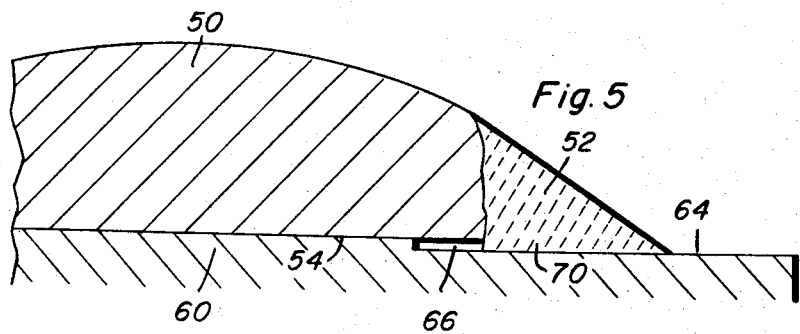

Referring to FIGURE 5 which shows the next step in the operation, it will be noted that the material of the same character as the original cutting blade portion of the bit which is of a much harder material than that of the bit body itself and which is shown by the numeral 52 is applied to the end of the bit body 50, being intimately and homogeneously bonded to the latter as by welding and which extends downwardly from the planar cutting surface 54 of the bit body to the recessed surface of the recess 64 to thus provide a laterally projecting portion 70 on the bit cutting portion.

With sufficient additional material applied to the cutting blade portion of the bit, the initially formed or restored bit is then removed from the jig and as shown in FIGURE 6 now has the flat planar cutting surface 54 of the bit body with a corresponding flat planar surface 72 of the cutting blade portion 52 offset laterally therefrom.

As the final step of this invention, as shown in FIGURE 7, the projecting portion 72 is now melted and fused with its cutting surface 72 into the cutting surface 54 of the bit body portion so as to provide a smooth slightly concave contour 76. There is thus provided the desired undercut surface of the bit.

It will be appreciated that the bit can then be finished in any of the usual manners to any desired shape of cutting edge.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A method of restoring the worn blade portion of a cutter bit of the type having an elongated metal body with a blade portion of a relatively harder metal than that of said body and homogeneously bonded to the latter which comprises the steps of supporting said body with its cutting face resting upon the supporting surface of a jig and with the worn blade portion overhanging a flat recess in said jig supporting surface, homogeneously bonding to said worn blade portion replacement material of a relatively harder metal than that of said body until the worn portion is restored and the replacement material projects into the jig recess and forms a flat cutting face positioned laterally beyond the cutting face of said body, and fusing the projecting portion of said replacement material smoothly into said body along the junction of their cutting faces while retaining the recess formed contour of the remote end of the replacement material cutting face, thereby producing a smoothly contoured, slightly concave cutting face on said bit.

2. A method for restoring the cutting edge of a worn tool bit of the type including an elongated metal body having a planar cutting face and a blade portion of a relatively harder metal than that of said body homogeneously bonded to one end of said body, comprising the steps of applying and homogeneously bonding to the worn surface of said blade portion additional material of a harder metal than that of said body until said blade portion is built up by said additional material, shaping said material against a smooth surface as it is applied to simultaneously define a smooth cutting face laterally offset beyond said body cutting face, and shaping said laterally offset cutting face of said additional material to merge smoothly into that of said body thereby providing a hollow ground cutting edge on said blade portion.

3. The method of claim 2 wherein said step of shaping the cutting face is effected by applying heat to and fusing the material of said laterally offset cutting face to said body cutting face in a smoothly curving continuous surface.

4. A method of applying a blade portion on a cutter bit of the type having an elongated metal body with the blade portion being of a relatively harder metal than that of the body and homogeneously bonded to the latter, said method comprising the steps of supporting the body with its cutting face resting upon the supporting surface of a jig and with the blade receiving end overhanging a flat-bottomed recess in said jig supporting surface, homogeneously bonding replacement material of a relatively harder metal than that of the bit body to said overhanging body end and simultaneously forming a flat cutting face on said replacement material offset laterally from the cutting face of said bit body through engagement of the replacement material with the flat bottom of said recess, and subsequently fusing the rear portion of the offset flat cutting face of the replacement material inwardly into smooth slightly concave engagement with the adjacent cutting face of the bit body.

5. The method of applying a blade portion on a bit body comprising the steps of simultaneously applying blade forming material to one end of said bit body and forming a smooth planar cutting surface laterally offset outward from the adjoining surface of the bit body, and subsequently smoothly blending the offset cutting surface into the adjacent bit body surface so as to define a slightly concave configuration.

6. The method of claim 5 wherein the blending of the cutting surface into the body surface is effected by application of heat.

References Cited
UNITED STATES PATENTS

| | | | |
|---|---|---|---|
| 2,682,180 | 6/1954 | Stolz | 76—101 |
| 2,867,137 | 1/1959 | Joy | 76—101 |

GRANVILLE Y. CUSTER, Jr., *Primary Examiner.*